United States Patent [19]
Agnew

[11] Patent Number: 6,014,995
[45] Date of Patent: Jan. 18, 2000

[54] ONSITE PETROCHEMICAL STORAGE AND TRANSPORT SYSTEM

[76] Inventor: A. Patrick Agnew, 33 Sunset Way SE, Calgary, Alberta, Canada, T2X 3H6

[21] Appl. No.: 09/126,747

[22] Filed: Jul. 31, 1998

[51] Int. Cl.[7] .................................................. F17D 1/00
[52] U.S. Cl. .............................. 141/231; 141/18; 141/98; 141/37; 137/208; 137/209; 137/236.1; 137/256; 137/263; 137/266; 137/267
[58] Field of Search .................. 141/1–7, 18, 21, 141/44, 52, 98, 231, 285, 302, 304, 382, 387, 388, 37; 137/208–210, 234.6, 236.1, 255, 256, 259, 263, 266, 267; 220/567.1, 567.2

[56] References Cited

U.S. PATENT DOCUMENTS

| | | |
|---|---|---|
| D. 298,273 | 10/1988 | Cobb . |
| 1,419,880 | 6/1922 | Mauclere ................................... 141/18 |
| 1,938,036 | 12/1933 | Martin et al. . |
| 2,491,013 | 12/1949 | Noll et al. . |
| 2,773,556 | 12/1956 | Meyers et al. ........................... 137/255 |
| 2,948,294 | 8/1960 | Smith ....................................... 137/263 |
| 2,953,155 | 9/1960 | Cummings ............................... 137/256 |
| 3,425,810 | 2/1969 | Scott . |
| 3,467,118 | 9/1969 | Gerwick, Jr. et al. ................... 137/256 |
| 3,563,263 | 2/1971 | Benson .................................... 137/266 |
| 3,664,388 | 5/1972 | Frankel ................................. 137/236.1 |
| 3,702,744 | 11/1972 | Brown et al. ........................ 137/236.1 |
| 3,807,433 | 4/1974 | Byrd ........................................ 137/255 |
| 4,190,072 | 2/1980 | Fernandez et al. .................. 137/236.1 |
| 4,446,804 | 5/1984 | Kristiansen et al. ..................... 137/263 |
| 4,880,040 | 11/1989 | Pierson et al. .............................. 141/5 |
| 5,040,933 | 8/1991 | Lee et al. . |
| 5,213,142 | 5/1993 | Koch et al. ............................... 141/98 |
| 5,253,682 | 10/1993 | Haskett et al. ............................. 141/3 |
| 5,603,360 | 2/1997 | Teel ......................................... 141/21 |
| 5,685,350 | 11/1997 | Chowdhury ............................ 141/231 |

*Primary Examiner*—J. Casimer Jacyna
*Attorney, Agent, or Firm*—Terrance Siemens

[57] ABSTRACT

An onsite petrochemical storage and transport system comprising a land based facility, which provides storage at a well site for hydrocarbon reservoir products which include gas, oil and water at a high pressure. The pressurized mixture is transferred, by means of pressure equalization, into a truck with multiple pressure containing vessels and transported to a plant suitable for processing the raw hydrocarbon mixture. The well site facility and transport truck are configured to allow for separation of gas and liquids to selectively transfer the gas or liquids as desired. Remote well sites may be periodically serviced by transport trucks while maintaining continuous production.

7 Claims, 3 Drawing Sheets

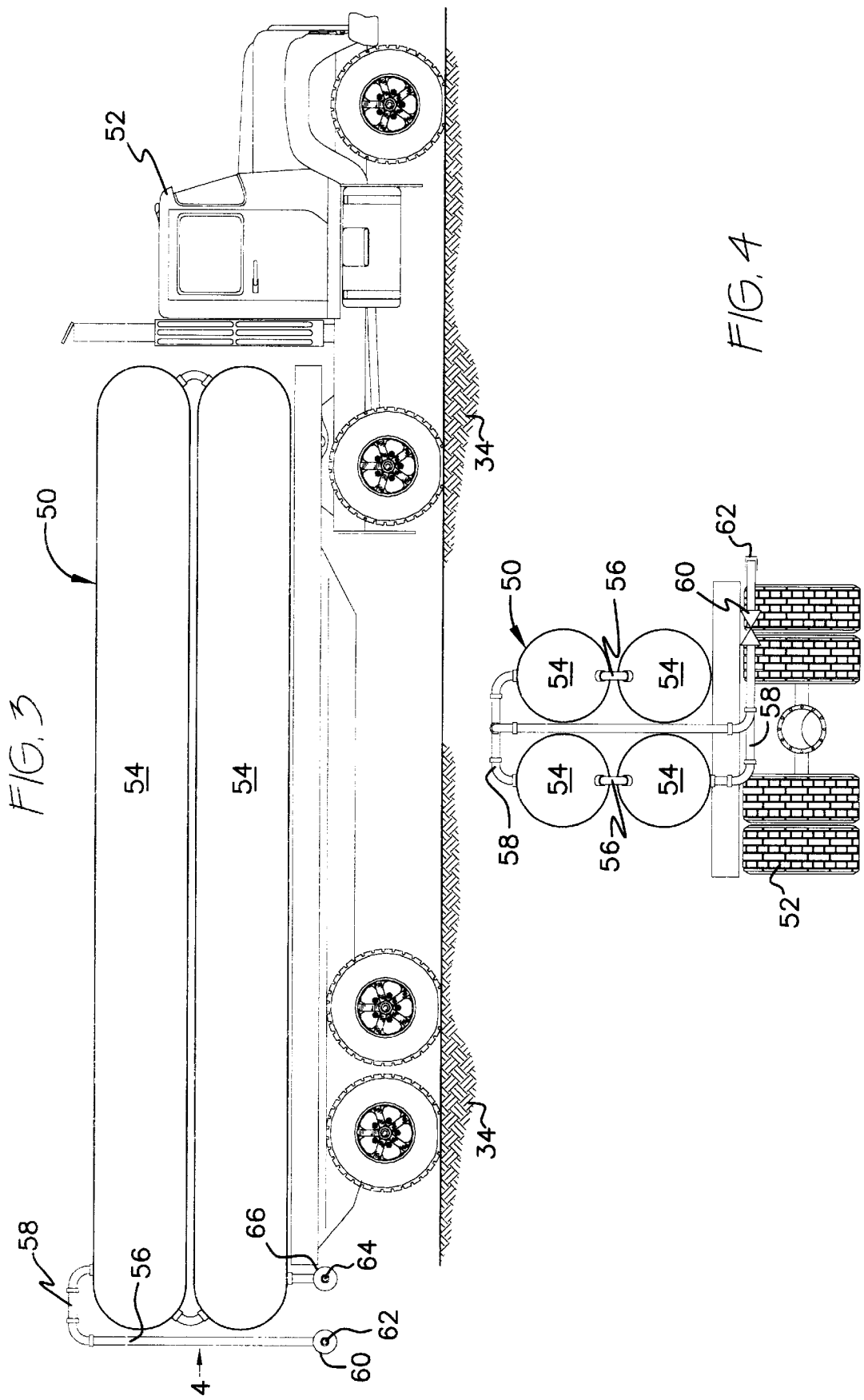

even upon further reading of the detailed description when considered in connection with the accompanying drawings.

ONSITE PETROCHEMICAL STORAGE AND TRANSPORT SYSTEM

BACKGROUND OF THE INVENTION

1. Field of the Invention

The present invention relates to devices for storing, removing and transporting liquids and gases. More particularly, the invention comprises an onsite petrochemical storage and transport system, which can economically allow the production of hydrocarbon from an oil or gas well and expedite or make it feasible to put certain wells into production.

2. Description of the Prior Art

Conventional natural gas production includes a well site facility and pipeline to a processing plant where free water and hydrocarbon liquids are removed and gas is conditioned to be suitable for transmission and domestic/industrial use. The well site facility may consist of separation, measurement flow and pressure control heating, injection of corrosion or hydrate inhibitor, may include fuel gas, power gas and electrical power, and may be remotely controlled from a plant control room. The pipeline connection from the well site to a plant inlet may be a conventional single pipeline with or without insulation and may require a fuel gas return pipeline if the production gas is unsuitable for fuel gas.

An oil well will normally have a pipeline connection to an oil supply where the gas component is removed from oil and sent to a gas plant for processing. In cases where the pipeline connection is not feasible, a single well site will be established where reservoir oil is directed to a tank at atmospheric pressure. Solution gas is released from the oil and directed to a flare stack, where the gas is combusted and the combustion products discharged into the atmosphere.

Devices for storing, removing and transporting liquids and gases are shown in U.S. Pat. No. 1,938,036, issued to Thomas C. Martin et al. on Dec. 5, 1933, U.S. Pat. No. 2,491,013, issued to Paul E. Noll et al. On Dec. 13, 1949, U.S. Pat. No. 3,425,810, issued to John W. Scott, Jr. on Feb. 4, 1969, U.S. Pat. No. 5,040,933, issued to Andrew Lee et al. on Aug. 20, 1991, U.S. Pat. No. 5,685,350, issued to Naser Mahmud Chowdhury on Nov. 11, 1997, and U.S. Pat. No. D.298,273, issued to James R. Cobb on Oct. 25, 1988.

U.S. Pat. No. 1,938,036 to Martin et al., shows a device for the removal of a substantially uniform proportion of a mixture of fluids having widely different vapor pressures and liquid and gas phases from a container, in which the mixture is confined under pressure. The present invention is different from this device in that it contains a well site underground array of storage tanks sloped for two-phase removal of gas and liquid.

U.S. Pat. No. 2,491,013 to Noll et al., shows a high pressure gas holder or storage container, and has particular reference to such a device that may be quickly erected at remote locations by ordinary assembly operations. The present invention is different from this holder in that it contains a well site underground array of storage tanks sloped for two-phase removal of gas and liquid.

U.S. Pat. No. 3,425,810 to Scott, Jr., shows an apparatus in the nature of reactors, for contacting liquid hydrocarbon oils with hydrogen-rich gas and solid particles such as catalysts at elevated temperature and pressure, and methods for using such apparatus for carrying out the contracting. The present invention is different from this apparatus in that it contains a well site underground array of storage tanks sloped for two-phase removal of gas and liquid.

U.S. Pat. No. 5,040,933 to Lee et al., shows a trailer for storing or transporting elongated cylindrical fluid containers and specifically to a trailer for tubes for containing compressed gas. The present invention is different from this trailer in that it utilizes a multiple container transport truck for carrying the gas and liquid discharged from the storage tanks to a processing plant.

U.S. Pat. No. 5,685,350 to Chowdhury, teaches the use of elongated, high pressure tubes to store, transport and dispense chemicals, e.g. gases under pressure. The present invention is different from this apparatus in that it utilizes a multiple container transport truck for carrying the gas and liquid discharged from the storage tanks to a processing plant.

U.S. Pat. No. D.298,273 to Cobb, shows an ornamental design for a multiple tank unit for temporary oil well production storage. The present invention is different from this multiple tank unit in that it contains a well site underground array of storage tanks sloped for two-phase removal of gas and liquid.

None of the above inventions and patents, taken either singly or in combination, is seen to describe the instant invention as claimed.

SUMMARY OF THE INVENTION

The present invention is an onsite petrochemical storage and transport system that consists of an onsite gas and liquid storage facility and a transportation facility.

Accordingly, it is a principal object of the invention is to provide an onsite petrochemical storage and transport system that will overcome the shortcomings of the prior art devices.

It is another object of the invention to provide an onsite petrochemical storage and transport system that contains a well site underground array of storage tanks sloped for two-phase removal of gas and liquid such as oil or water.

An additional object of the invention is to provide an onsite petrochemical storage and transport system that utilizes a multiple container transport truck for carrying the gas and liquid discharged from the storage tanks to a processing plant.

A still additional object of the invention is to provide an onsite petrochemical storage and transport system which will allow unattended storage at remote well sites that can just let the well pump for a long time, with a large transport capacity for emptying accumulated storage periodically from the remote well site.

A further object of the invention is to provide an onsite petrochemical storage and transport system that is simple and easy to use.

A still further object of the invention is to provide an onsite petrochemical storage and transport system that is economical in cost to manufacture.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 3 is an enlarged side view of the transport trailer taken in the direction of arrow 3 in FIG. 2.

FIG. 4 is an enlarged rear view of the transport trailer taken in the direction of arrow 4 in FIG. 3.

DETAILED DESCRIPTION OF THE PREFERRED EMBODIMENTS

Figure 1:
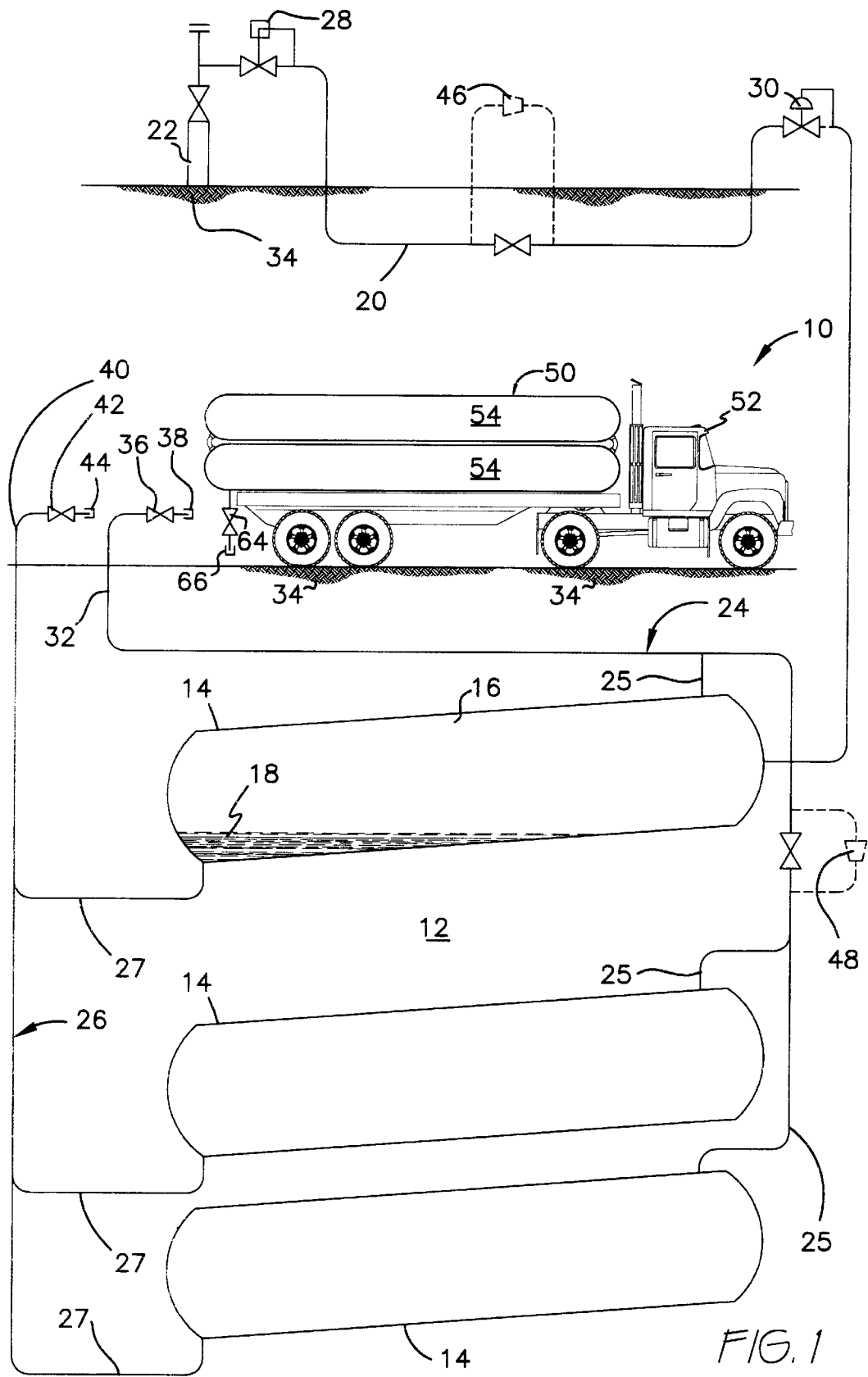
FIG. 1 is a diagrammatic side view of the present invention, showing an onsite storage, loading and unloading facility, as well as a truck mounted transport trailer.
Figure 2:
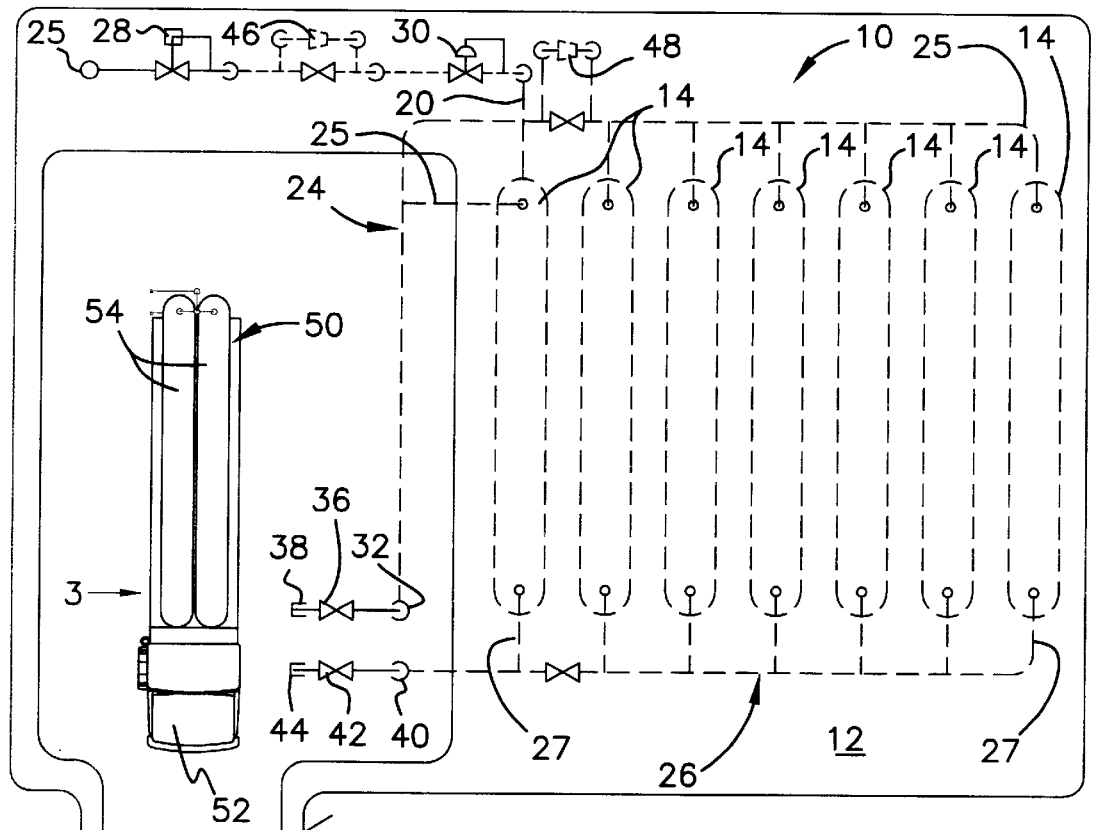
FIG. 2 is a diagrammatic plan view, showing the well site facility and the truck loading configuration.
Figure 2:
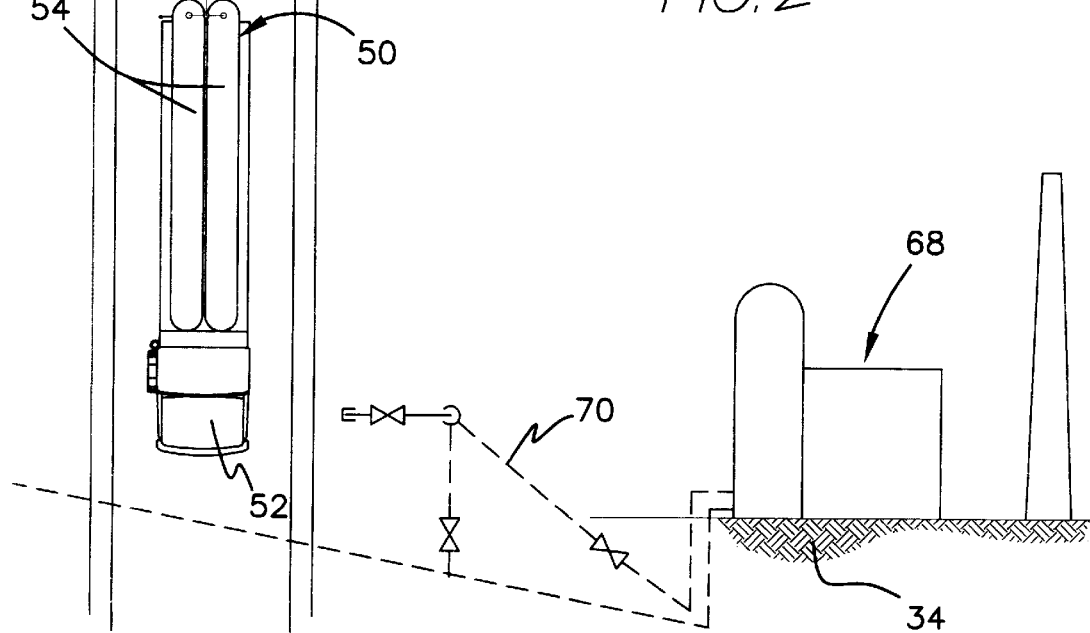

Turning now descriptively to the drawings, FIGS. 1 and 2 illustrate the present invention. Onsite petrochemical storage and transport system 10, includes an onsite gas and liquid storage facility 12 being an underground array of elongated storage tanks 14. Each of the storage tanks 14 are sloped with one end lower than the other end for two-phase removal of a gas 16 and a liquid 18. Underground pipeline 20 extends between a conventional gas and liquid well 22 to a first one of the storage tanks 14. Underground top gas header 24 has gas pipes 25 extending between top high ends of all storage tanks 14, to allow the gas 16 to flow freely between storage tanks 14 under pressure. Underground bottom liquid header 26 has liquid pipes 27 extending between bottom lower ends of all storage tanks 14, to allow the liquid 18 to flow freely between storage tanks 14 under pressure.

The underground pipeline 20 includes an emergency shutdown valve 28 at well 22. A pressure controlling valve 30 allows well 22 to flow freely into storage tanks 14 until a maximum pressure is achieved, wherein pressure controlling valve 30 will automatically close. Gas unloading riser 32 is connected at a first end to top gas header 24 and extends up through the ground 34. Gas unloading valve 36 is connected to a second end of gas unloading riser 32 above the ground 34. Gas quick connector 38 is at the gas unloading valve 36. Liquid unloading riser 40 is connected at a first end to bottom liquid header 26 and extends up through the ground 34. Liquid unloading valve 42 is connected to a second end of liquid unloading riser 40 above the ground 34. Liquid quick connector 44 is at the liquid unloading valve 42.

Onsite petrochemical storage and transport system 10 further includes a compressor 46 connected to underground pipeline 20, which will raise the pressure of the gas 16 when low from the well 22, so as to properly fill storage tanks 14 with the gas 16. A second compressor 48 can be connected to top gas header 24, which will raise the pressure of the gas 16 between storage tanks 14, so as to properly fill storage tanks 14 with the gas 16.

The onsite petrochemical storage and transport system 10, best seen in FIGS. 3 and 4, also contains a transportation facility 50 comprising a transport truck 52. A plurality of pressure containers 54 are positioned horizontally upon transport truck 52 and interconnected with vertical and horizontal pipe connectors 56, 58 to create, in essence, a single large pressure container, which allows for a two phase separation of the gas 16 and liquid 18. Gas loading valve 60 is connected to pressure containers 54. Gas quick coupler 62 at gas loading valve 60 engages with gas quick connector 38 at gas unloading valve 36 of the storage site. Liquid loading valve 64 is connected to pressure containers 54. A liquid quick coupler 66 at liquid loading valve 64 engages with liquid quick connector 44 at liquid unloading valve 42 of the storage site. Transport truck 52 once loaded, is unloaded at a point of access to a processing plant 68, such as at an inlet header pipeline connection 70, where the gas 16 and liquid 18 payload is discharged into the processing plant 68 (see FIG. 2).

It is to be understood that the present invention is not limited to the embodiments described above, but encompasses any and all embodiments within the scope of the following claims.

I claim:

1. An onsite petrochemical storage and transport system, which includes an onsite gas and liquid storage facility comprising:

an underground array of elongated storage tanks, wherein each of said storage tanks are sloped with one end lower than the other end for two-phase removal of a gas and a liquid;

an underground pipeline extending between a conventional gas and liquid well to a first one of said storage tanks;

an underground top gas header having gas pipes extending between top high ends of all said storage tanks to allow said gas to flow freely between said storage tanks under pressure; and an underground bottom liquid header having liquid pipes extending between bottom lower ends of all said storage tanks, to allow said liquid to flow freely between said storage tanks under pressure.

2. An onsite petrochemical storage and transport system as recited in claim 1, wherein said underground pipeline includes:

an emergency shutdown valve at the well; and a pressure controlling valve to allow said well to flow freely into said storage tanks until a maximum pressure is achieved, wherein said pressure controlling valve will automatically close.

3. An onsite petrochemical storage and transport system as recited in claim 1, further including:

a gas unloading riser connected at a first end to said top gas header and extending up through the ground;

a gas unloading valve connected to a second end of said gas unloading riser above the ground; and a gas quick connector at said gas unloading valve.

4. An onsite petrochemical storage and transport system as recited in claim 3, further including:

a liquid unloading riser connected at a first end to said bottom liquid header and extending up through the ground;

a liquid unloading valve connected to a second end of said liquid unloading riser above the ground; and a liquid quick connector at said gas unloading valve.

5. An onsite petrochemical storage and transport system as recited in claim 4, further including a transportation facility comprising:

a transport truck;

a plurality of pressure containers positioned horizontally upon said transport truck and interconnected with vertical and horizontal pipe connectors to create an effect of a single large pressure container, which will allow for a two phase separation of the gas and liquid;

a gas loading valve connected to said pressure containers;

a gas quick coupler at said gas loading valve to engage with said gas quick connector at said gas unloading valve of storage site;

a liquid loading valve connected to said pressure containers; and a liquid quick coupler at said liquid loading valve to engage with said liquid quick connector at said liquid unloading valve of storage site, so that said transport truck once loaded is unloaded at a point of access to a processing plant, such as at an inlet header pipeline connection, where the gas and liquid payload is discharged into the processing plant.

6. An onsite petrochemical storage and transport system as recited in claim 1, further including a compressor connected to said underground pipeline, which will raise the pressure of the gas when low from the well, so as to properly fill said storage tanks with the gas.

7. An onsite petrochemical storage and transport system as recited in claim 1, further including a compressor connected to said top gas header, which will raise the pressure of the gas between said storage tanks, so as to properly fill said storage tanks with the gas.

\* \* \* \* \*